United States Patent
Xu et al.

(10) Patent No.: US 12,469,156 B2
(45) Date of Patent: Nov. 11, 2025

(54) MAKING MEASUREMENTS OF THE HIP

(71) Applicant: KONINKLIJKE PHILIPS N.V., Eindhoven (NL)

(72) Inventors: Jing Ping Xu, Shanghai (CN); Anthony M. Gades, Snohomish, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 389 days.

(21) Appl. No.: 17/924,033

(22) PCT Filed: May 8, 2021

(86) PCT No.: PCT/EP2021/062242
§ 371 (c)(1),
(2) Date: Nov. 8, 2022

(87) PCT Pub. No.: WO2021/228728
PCT Pub. Date: Nov. 18, 2021

(65) Prior Publication Data
US 2023/0186504 A1    Jun. 15, 2023

(30) Foreign Application Priority Data

May 13, 2020    (WO) ................. PCT/CN2020/089940
Jun. 25, 2020    (EP) ..................................... 20182285

(51) Int. Cl.
*G06T 7/60* (2017.01)
*G06T 7/00* (2017.01)
(Continued)

(52) U.S. Cl.
CPC .............. *G06T 7/60* (2013.01); *G06T 7/0012* (2013.01); *G06T 7/11* (2017.01); *G06T 7/168* (2017.01);
(Continued)

(58) Field of Classification Search
None
See application file for complete search history.

(56) References Cited

U.S. PATENT DOCUMENTS 6,530,885 B1    3/2003    Entrekin et al.
6,663,896 B1    12/2003    Detmer
(Continued)

FOREIGN PATENT DOCUMENTS

WO    2016191870 A1    12/2016

OTHER PUBLICATIONS

International Search Report and Written Opinion for PCT/EP2021/062242; Mailing date: Jul. 21, 2021, 8 pages.
(Continued)

*Primary Examiner* — Vikkram Bali

(57) ABSTRACT

In a method for making a measurement of the hip in an ultrasound image, an ultrasound image of the hip is obtained. A spatial coherence map associated with one or more lags of the ultrasound waves associated with the ultrasound image is also obtained. Then a quality metric is determined based on the ultrasound image of the hip and the spatial coherence map. The quality metric indicates the suitability of the ultrasound image for making the measurement of the hip. If the quality metric indicates that the ultrasound image is above a threshold quality, then the method then comprises indicating that the ultrasound image is suitable for making the measurement of the hip.

15 Claims, 6 Drawing Sheets

(51) Int. Cl.
  *G06T 7/11* (2017.01)
  *G06T 7/168* (2017.01)
  *G06T 11/60* (2006.01)
(52) U.S. Cl.
  CPC .... *G06T 11/60* (2013.01); *G06T 2207/10132* (2013.01); *G06T 2207/20061* (2013.01); *G06T 2207/20081* (2013.01); *G06T 2207/30008* (2013.01)

(56) References Cited

U.S. PATENT DOCUMENTS

| | | | |
|---|---|---|---|
| 12,207,973 B2* | 1/2025 | Alizad | A61B 8/0891 |
| 2020/0401832 A1* | 12/2020 | Peng | A61B 8/469 |
| 2021/0232915 A1* | 7/2021 | Dalli | G06F 18/2113 |
| 2024/0245375 A1* | 7/2024 | Wollowick | G06T 7/0014 |

OTHER PUBLICATIONS

Mostofi, E. et al., "Reliability of 2D and 3D ultrasound for infant hip dysplasia in the hands of novice users", European Radiology, 2019, vol. 29, pp. 1489-1495.

Golan, D. et al., "Fully Automating Graf's Method for DDH Diagnosis Using Deep Convolutional Neural Networks", Deep Learning and Data Labeling for Medical Applications, 2016, pp. 130-141.

Long, W. et al., "Lag-One Coherence as a Metric for Ultrasonic Image Quality", IEEE Transactions on Ultrasonics, Ferroelectrics, and Frequency Control, 2018, vol. 65, No. 10, pp. 1768-1780.

Bingxuan, H. et al., "Ultrasound measurement and analysis of the hip in healthy infants:a multicenter study", Chin J Ultrasonography, 2018, vol. 27, No. 5, 6 Pages.

Hareendranathan, A.R. et al., "A technique for semiautomatic segmentation of echogenic structures in 3D ultrasound, applied to infant hip dysplasia", Int J Comput Assist Radiol Surg, 2016, vol. 11, pp. 31-42.

Kolb, A. et al., "Measurement considerations on examiner-dependent factors in the ultrasound assessment of developmental dysplasia of the hip", Int Orthop., 2017, vol. 41, pp. 1245-1250.

Graf, R. et al., "Hip sonography update. Quality-management, catastrophes—tips and tricks", Med Ultrason., 2013, vol. 15, No. 4, pp. 299-303.

Diederichs, C. et al., "Cross-Modality Validation of Acetabular Surface Models Using 3-D Ultrasound Versus Magnetic Resonance Imaging in Normal and Dysplastic Infant Hips", Ultrasound in Med. & Biol., 2016, vol. 42, pp. 2308-2314.

Zonoobi, D. et al., "Developmental hip dysplasia diagnosis at Three-dimensional US: A multicenter study", Radiology, 2018, vol. 287, No. 3, pp. 1003-1015.

Quader, N. et al., "Automatic evaluation of scan adequacy and dysplasia metrics in 2D ultrasound images of the heonatal hip", Ultrasound in Med. & Biol., 2017, vol. 43, No. 6, pp. 1252-1262.

De Luis-Grarcia, R. et al., "Analysis of Ultrasound Images Based on Local Statistics. Application to the Diagnosis of Developmental Dysplasia of the Hip", IEEE Ultrasonics Symposium, 2007, pp. 2531-2534.

Cevik, K.K. et al., "Segmentation of the Ilium and Femur Regions from Ultrasound Images for Diagnosis of Developmental Dysplasia of the Hip", Journal of Medical Imaging and Health Informatics, 2016, vol. 6, pp. 449-457.

Paserin, O. et al, "Automatic Near Real-Time Evaluation of 3D Ultrasound Scan Adequacy for Developmental Dysplasia of the Hip", Computer Assisted and Robotic Endoscopy and Clinical Image-Based Procedures, 2017, pp. 124-132.

Prevost, R. et al., "3D freehand ultrasound without external tracking using deep learning", Medical Image Analysis, 2018, vol. 48, pp. 187-202.

Hyun, D. et al., "Short-lag spatial coherence imaging on matrix arrays, Part 1: Beamforming methods and simulation studies," IEEE Transactions on Ultrasonics, Ferroelectrics, and Frequency Control, 2014, vol. 61, No. 7, pp. 1101-1112.

Ecabet, O. et al., "Automatic Model-Based Segmentation of the Heart in CT Images", IEEE Transactions on Medical Imaging, 2008, vol. 27, No. 9, pp. 1189-1201.

* cited by examiner

MAKING MEASUREMENTS OF THE HIP

CROSS-REFERENCE TO PRIOR APPLICATIONS

This application is the U.S. National Phase application under 35 U.S.C. § 371 of International Application No. PCT/EP2021/062242, filed on May 8, 2021, which claims the benefit of Chinese Patent Application No. PCT/CN2020/089940, filed May 13, 2020, and European Patent Application No. 20182285.5, filed on Jun. 25, 2020. These applications are hereby incorporated by reference herein.

TECHNICAL FIELD

The disclosure herein relates to ultrasound imaging. Particularly, but non-exclusively, embodiments herein relate to systems and methods for making measurements in ultrasound images of the hip.

BACKGROUND

Ultrasound (US) imaging is used in a range of medical applications such as, for example, fetal monitoring. Medical ultrasound imaging involves moving a probe comprising an ultrasound transducer that produces high frequency sound waves over the skin. The high frequency sound waves are transmitted into the soft tissue and traverse/propagate through the tissue and reflect off internal surfaces (e.g. tissue boundaries). The reflected waves or echoes from the medium being interrogated are detected and used to build up/form an image of the internal structures of interest.

Ultrasound imaging can be used to create two or three dimensional images. In a typical workflow, a user (e.g. sonographer, radiologist, clinician or other medical professional) may use two-dimensional imaging to locate an anatomical feature of interest. Once the feature is located in two dimensions, the user may activate a three-dimensional mode to take a three-dimensional image.

It is an object of embodiments herein to provide systems and methods that may improve the efficacy of ultrasound imaging.

SUMMARY

Developmental dysplasia of the hip (DDH) is an umbrella term describing all forms of abnormal development of the hip joint in babies and young children. The overall incidence is 1-3/1000 live births, with ethnical and geographical variance. DDH has a broad spectrum of presentation with minor findings often resolving spontaneously whilst the most severe examples may result in disability if not diagnosed early in life. The successful management of an infant with DDH is dependent on early diagnosis and suitable treatment.

There are several methods used in clinical practice to diagnose DDH, including 1) Physical examination of newborns, especially those at higher risk of DDH due to, for example, ethnicity, family history, and/or pregnancy history and 2) Medical imaging (for example: Ultrasound imaging and magnetic resonance imaging (MRD, X-ray radiography or computed tomography (CT)).

Physical examination methods tend to be less reliable and highly dependent on operator experience. Medical imaging is being increasingly used in screening/diagnosis and follow-up across the whole cycle of diagnosis and management of infants with DDH (for example: to confirm hip reduction after surgery). MRI may generally provide detailed information on the structure for the hip. However, there are issues associated with the use of MRI in screening and diagnosis of DDH including: a) high cost; b) that it can be difficult to obtain adequate MRI images unless the infant is sedated (infants older than 4-6 weeks generally move too much to be scanned without sedation); c) long scan times compared to ultrasound imaging (several ten minutes per scan for MRI compared to a few minutes for 2D ultrasound or a few seconds for 3D Ultrasound); d) the pre-MRI process to settle small infants may be time-consuming for staff and parents possibly leading to the MRI scan becoming impractical e) if sedatives are required in order to obtain diagnostic quality images beyond the neonatal period, then this comes with a risk of brain injury or even death.

It is therefore desirable to use ultrasound imaging where possible to detect and monitor DDH in infants. Although Ultrasound imaging is widely used in selective screening of infants with a high risk of DDH, it is challenging to identify in real-time e.g. during an ultrasound examination, ultrasound image frames that are of sufficient quality to enable measurements of key anatomic structures of the hip (e.g. ilium and femur head) to be made. This may lead to inadequate images being obtained, leading to poor quality measurements and diagnoses, and/or wasted time and resources if an ultrasound examination has to be repeated. It is an object of embodiments herein to improve upon this situation by aiding sonographers and other users of ultrasound imaging equipment to obtain real-time feedback and/or guidance to help them obtain high quality ultrasound images suitable for making DDH measurements.

Thus, according to a first aspect, there is a system for making a measurement of the hip in an ultrasound image. The system comprises a memory comprising instruction data representing a set of instructions, and a processor configured to communicate with the memory and to execute the set of instructions. The set of instructions, when executed by the processor, cause the processor to: obtain an ultrasound image of the hip; obtain a spatial coherence map associated with one or more lags of the ultrasound waves associated with the ultrasound image; determine a quality metric based on the ultrasound image of the hip and the spatial coherence map, wherein the quality metric indicates the suitability of the ultrasound image for making the measurement of the hip; and if the quality metric indicates that the ultrasound image is above a threshold quality, indicate that the ultrasound image is suitable for making the measurement of the hip.

In this way, image frames can be assessed for their quality/suitability for making measurements of the hip in real-time whilst a sonographer or other user is performing an ultrasound examination of the hip. This provides an objective measure with which to determine whether an image is of suitable quality. Without such a method, the quality of the obtained ultrasound images are dependent on the operator's ability or intuitive 'feeling' for whether an image is suitable during real-time examination. Furthermore, as will be described in more detail below, various structures of the hip, such as the femur head and/or the boundary between the ilium and nearby tissues, may appear more prominently (or brightly) in the coherence maps compared to the ultrasound image itself. This provides additional information on the suitability of the ultrasound image for making the measurement, for example, whether the features are imaged at an appropriate quality, and at an appropriate angle/slice through the hip. In this way there is thus an improved system for obtaining images suitable for making measurements of the hip.

According to a second aspect, there is a method for making a measurement of the hip in an ultrasound image. The method comprises obtaining an ultrasound image of the hip; obtaining a spatial coherence map associated with one or more lags of the ultrasound waves associated with the ultrasound image; determining a quality metric based on the ultrasound image of the hip and the spatial coherence map, wherein the quality metric indicates the suitability of the ultrasound image for making the measurement of the hip; and if the quality metric indicates that the ultrasound image is above a threshold quality, indicate that the ultrasound image is suitable for making the measurement of the hip.

According to a third aspect there is a computer program product comprising a computer readable medium, the computer readable medium having computer readable code embodied therein, the computer readable code being configured such that, on execution by a suitable computer or processor, the computer or processor is caused to perform the method of the second aspect.

BRIEF DESCRIPTION OF THE DRAWINGS

For a better understanding and to show more clearly how embodiments herein may be carried into effect, reference will now be made, by way of example only, to the accompanying drawings, in which:

FIG. 3a illustrates an ultrasound image of the hip;

FIGS. 3b, 3c and 3d illustrate coherence maps associated with different lags for the ultrasound image in FIG. 3a;

FIGS. 4e, 4f, 4g and 4h illustrate further coherence maps associated with different lags for the ultrasound image of the hip in FIG. 3a;

DETAILED DESCRIPTION

As described above, one application of Ultrasound imaging is to image the hips of infants in order to diagnose and monitor Developmental Dysplasia of the Hip (DDH). There are various advantages associated with making measurements in ultrasound images compared to MRI, for example, however the accuracy of the measurements is sensitive to the quality of the ultrasound images obtained, both in terms of image quality and whether an appropriate slice through the hip joint has been obtained.

Figure 1:
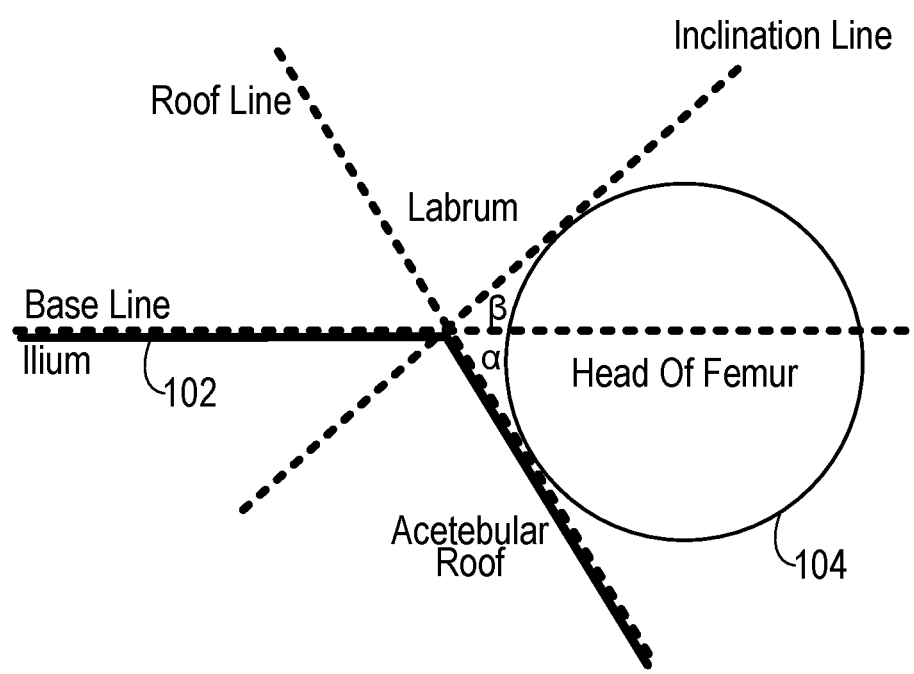
FIG. 1 illustrates a prior art measurement regime for determining DDH.

FIG. 1 shows a prior art example of measurements that may be made in an ultrasound image of a hip in order to diagnose or monitor DDH according to the Graf measurement system. In this system the position of the Ilium 102 and the Head of the Femur 104 are used to determine the values of the angles α and β and diagnose DDH. See article by R. Graf, M. Mohajer and F. Plattner, entitled '*Hip sonography update. Quality-management, carastrophes-tips and tricks*', Med Ultrason, 2013, Vol. 15:299-303 for more details.

The Graf method is recommended in various guidelines in order to standardize measurement and diagnosis of DDH. However, the Graf measurement system still requires a high level of user (e.g. operator or sonographer) experience to correctly measure the angles α and β. For example, it may be necessary to perform 50-100 examinations before becoming comfortable with the ultrasound scanning procedure required of Graf. Limitations of the Graf method include relatively high inter-observer and inter-scan variability, potentially altering the final diagnosis in 50° 4-70% of infants if scanned by a non-expert. Over-diagnosis of DDH leads to increased health care costs and unnecessary treatment especially for the patients who are borderline dysplastic. Furthermore, the repeatability or reproducibility of these metrics from 2D ultrasound is really dependent on operator/examiner due to the following reasons:

1) 2D ultrasound examination is highly operator-dependent.
2) Probe or transducer orientation determines the image US quality of the standardized plane and impacts on the measurement results because 2D ultrasound imaging shows only a partial view of the complex 3D acetabular shape.

The aforementioned difficulties associated with the Graf method are discussed, for example, in the article by D. Zonoobi, et. al., entitled: 'Developmental hip dysplasia diagnosis at Three-dimensional US: A multicenter study', Radiology, 2018, Vol. 287: 1003-1015.

3D ultrasound for DDH was proposed and studied in the 1990s, and has shown some benefits in providing a more complete view of hip geometry and by obtaining high fidelity to 3D MRI. Some 3D indexes (similar to the Graf angles) have been introduced and confirmed to have higher reliability than dysplasia metrics measured from 2D ultrasound images.

Some studies have proposed to automate the measurements of the hip (e.g. Graf or 3D equivalents) in ultrasound imaging, for example, by training a machine learning model to predict the angles α and β from the input images. Such approaches may be complex however and require high computational load which may not be suitable for bedside ultrasound clinical applications in DDH diagnosis and screening as well as follow-up examination. There is therefore a need for reliable, lightweight methods of making measurements of the hip in ultrasound images.

To this end, some embodiments herein propose systems and methods to assess ultrasound images of the hip during an ultrasound examination and determine whether a suitable image has been obtained with which to make the measurements. This ensures that the measurements are made on images of appropriate quality in order to improve accuracy. Furthermore, the quality metric can be used in real time to provide feedback and/or guidance to the user performing the ultrasound examination (e.g. sonographer) to let them know whether they have captured an image of sufficient quality for the purposes of making the hip measurements. The quality metric proposed is based on the ultrasound image of the hip and a spatial coherence map, which has the advantage of providing an objective measure with which to determine whether an image is of suitable quality. Without such a method, the quality of the obtained ultrasound images may be dependent on the operator's ability or intuitive 'feeling' for whether an image is suitable during the real-time examination.

Figure 2:
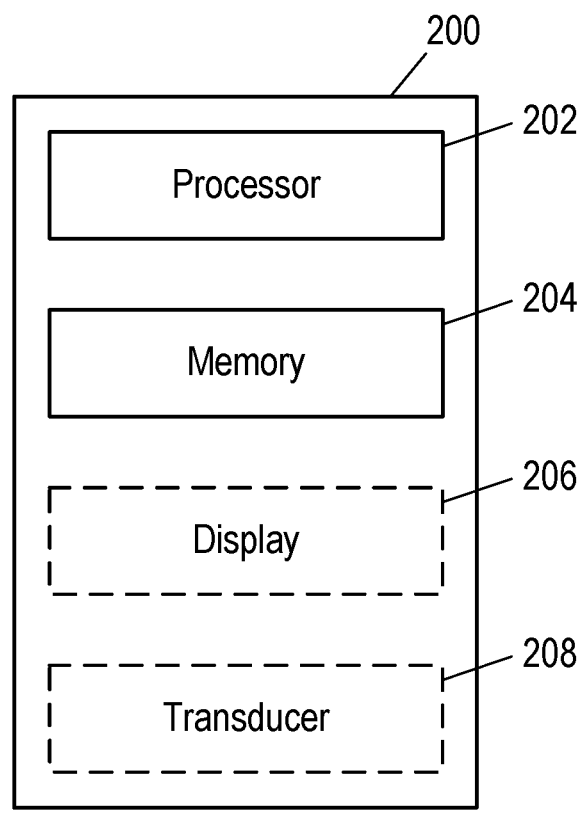
FIG. 2 illustrates an example system according to some embodiments herein.

FIG. 2 illustrates a system (e.g. apparatus) 200 for recording ultrasound images according to some embodiments herein. The system 200 may be for recording (e.g. acquiring or taking) ultrasound images. In some embodiments, the system 200 may comprise or form part of a medical device such as an ultrasound system.

With reference to FIG. 2, the system 200 comprises a processor 202 that controls the operation of the system 200 and that can implement the method described herein. The processor 202 can comprise one or more processors, processing units, multi-core processors or modules that are configured or programmed to control the system 200 in the manner described herein. In particular implementations, the processor 202 can comprise a plurality of software and/or hardware modules that are each configured to perform, or are for performing, individual or multiple steps of the method described herein.

Briefly, the processor 202 of the system 200 is configured to obtain an ultrasound image of the hip; obtain a spatial coherence map associated with one or more lags of the ultrasound waves associated with the ultrasound image; determine a quality metric based on the ultrasound image of the hip and the spatial coherence map, wherein the quality metric indicates the suitability of the ultrasound image for making the measurement of the hip; and, if the quality metric indicates that the ultrasound image is above a threshold quality, indicate that the ultrasound image is suitable for making the measurement of the hip.

Technically, this may provide an improved manner in which to obtain ultrasound images of sufficient quality that they are suitable for making measurements of the hip that can be used to make a DDH diagnosis. Without such a method, a sonographer may effectively be imaging "blind" without knowledge of whether they are capturing images that may be used to accurately determine the required measurements (e.g. such as the aforementioned Graf measurements).

In some embodiments, as illustrated in FIG. 2, the system 200 may also comprise a memory 204 configured to store program code that can be executed by the processor 202 to cause the processor to perform the method described herein. Alternatively or in addition, one or more memories 204 may be external to (i.e. separate to or remote from) the system 200. For example, one or more memories 204 may be part of another device. A memory 206 can be used to store images, information, data, signals and measurements acquired or made by the processor 202 of the system 200 or from any interfaces, memories or devices that are external to the system 200.

In some embodiments, as illustrated in FIG. 2, the system 200 may further comprise a transducer 208 for capturing ultrasound images. Alternatively or additionally, the system 200 may receive (e.g. via a wired or wireless connection) a data stream of two dimensional images taken using an ultrasound transducer that is external to the system 200.

The transducer 208 may be formed from a plurality of transducer elements. Such transducer elements may be arranged to form an array of transducer elements. The transducer may be comprised in a probe such as a handheld probe that can be held by a user (e.g. sonographer, radiologist or other clinician) and moved over a patient's skin. The skilled person will be familiar with the principles of ultrasound imaging, but in brief, ultrasound transducers comprise piezoelectric crystals that can be used both to generate and detect/receive sound waves. Ultrasound waves produced by the ultrasound transducer pass into the patient's body and reflect off the underlying tissue structures. Reflected waves (e.g. echoes) are detected by the transducer and compiled (processed) by a computer to produce an ultrasound image of the underlying anatomical structures, otherwise known as a sonogram.

In some embodiments the transducer 208 may comprise a matrix transducer that may interrogate a volume space. In some embodiments, the transducer may comprise a high-frequency linear ultrasound probe. In some embodiments the transducer may comprise a 1D transducer formed, for example, from a tightly contact and light-weight array or wireless array of about 6 MHz (or higher). In some embodiments the transducer may comprise a high frequency 2D array probe, for example, such as a Capacitive Micromachine Ultrasonic transducer (CMUT).

In some embodiments, as illustrated in FIG. 2, the system 200 may also comprise at least one user interface such as a user display 206. The processor 202 may be configured to control the user display 206 to display or render, for example, portions of the received data stream or ultrasound images to the user. The user display may further display an indication of whether an ultrasound image captured using the transducer is suitable for making the measurement of the hip (e.g. the user display 206 may display the output of the method described herein). The user display 206 may comprise a touch screen or an application (for example, on a tablet or smartphone), a display screen, a graphical user interface (GUI) or other visual rendering component.

Alternatively or in addition, at least one user display 206 may be external to (i.e. separate to or remote from) the system 200. For example, at least one user display 206 may be part of another device. In such embodiments, the processor 202 may be configured to send an instruction (e.g. via a wireless or wired connection) to the user display 206 that is external to the system 200 in order to trigger (e.g. cause or initiate) the external user displays to display an indication of whether an ultrasound image captured using the transducer is suitable for making the measurement of the hip (e.g. the user display 206 may display the output of the method described herein).

It will be appreciated that FIG. 2 only shows the components required to illustrate this aspect of the disclosure, and in a practical implementation the system 200 may comprise additional components to those shown. For example, the system 200 may comprise a battery or other means for connecting the system 200 to a mains power supply. In some embodiments, as illustrated in FIG. 2, the system 200 may also comprise a communications interface (or circuitry) for enabling the system 200 to communicate with any interfaces, memories and devices that are internal or external to the system 200, for example over a wired or wireless network.

In more detail, the system 200 may be suitable for making a measurement of a hip (e.g. a neonate or infant's hip) in an ultrasound image. The measurement may comprise a measurement, for example, suitable for making a diagnosis of DDH. The measurement may thus comprise a dysplastic measurement. For example, in some embodiments, the measurement may comprise a Graf measurement as described above. The skilled person will appreciate however that the Graf measures are merely examples and that other measurements of the hip could equally be made, for example, the three dimensional hip measurements described in the paper by C. Diederichs, et. al., entitled: 'Cross-modality validation of acetabular surface models using 3-D ultrasound versus magnetic resonance imaging in normal and dysplastic infant hips', Ultrasound in Med. & Biol., 2016, Vol. 42:2308-2314.

The ultrasound image may be captured as part of an ultrasound examination, for example, of a baby, infant or young child's hips for the purpose of making a DDH diagnosis.

Generally, the ultrasound image may comprise a two-dimensional image or a three-dimensional image. The image may comprise different modalities, for example, the image may comprise a B-mode ultrasound image, a Doppler ultrasound image or an elastography mode image.

In some embodiments, the ultrasound image may be obtained in real time. For example, the ultrasound image may be obtained as part of an ongoing or "live" ultrasound examination. In other embodiments, the ultrasound image may be obtained from a historical ultrasound examination (e.g. retrieved from a database).

In embodiments where the system 200 comprises a transducer 208, the ultrasound image may be obtained from data captured using the transducer 208 and processed by the processor to produce the ultrasound image. Alternatively, the ultrasound image may be received from a remote transducer (e.g. sent over the internet).

In some embodiments, a standardized 2D ultrasound image including the ilium and femur head may be displayed to the user using the display 208 as reference for the user performing the ultrasound examination. Using such example 2D images and their landmarks as guidance, the user may be able to move the ultrasound probe until a suitably high quality ultrasound image is obtained, as described below.

Generally, in an ultrasound examination, the user (sonographer or person performing the examination) may put the probe in a suitable position and angle onto the hip region, and then acquire either a 2D or 3D image.

In a 2D US examination, the user may sweep the ultrasound probe across the area of the hip of the infant at fixed/varied speed, and a 2D US image sequence will be collected during this dynamic scanning and saved into memory, for example, in the DICOM image format or as raw US data. An intelligent AI algorithm may pick the best representative frame (called the best image for later measurement).

Put another way, in some embodiments, the processor being caused to obtain an ultrasound image of the hip may comprise the processor being caused to: receive a plurality of two dimensional ultrasound images; use a model trained using a machine learning process to determine a best image for later measurement from the plurality of two dimensional ultrasound images; and select the best image for later measurement as the obtained ultrasound image. The quality metric method below may be performed on the obtained ultrasound image ("best image for later measurement") according to the method set out below.

The method described herein may also be performed on any (or all) 2D frames imaged by a sonographer as part of an ultrasound examination.

In some embodiments, a 3D US volume may be obtained from the acquired 2D US image sequence. For example, a 2D probe may be moved around the area of the hip until a suitable 3D US volume or volume sequence is acquired. In these embodiments, the quality metric may be computed based on a few slices at the middle line are selected for this purpose. Put another way, in some embodiments, the processor being caused to obtain an ultrasound image may comprise the processor being caused to: receive a plurality of two dimensional ultrasound images; use a model trained using a machine learning process to reconstruct a three-dimensional volume from the plurality of two dimensional ultrasound images, and select a slice through the three dimensional volume as the obtained ultrasound image.

A machine learning process may be trained to reconstruct a 3D volume from a sequence of 2D ultrasound images, using a process such as that set out in the paper by R. Prevost, et al, entitled: '3D freehand ultrasound without external tracking using deep learning', Medical Image Analysis, 2018, Vol. 48:187-202.

Turning now to the coherence map, the skilled person will be familiar with spatial coherence maps, however in brief, a spatial coherence map describes spatial coherence properties of the signal backscattered by the tissues of the subject (e.g. infant/neonate) under examination and measured by an ultrasound transducer array. Generally, the spatial coherence of a wave is a measure of how it changes as a function of distance. A spatial coherence map may, for example, yield bright pixel values in regions where there is partial or high-coherence, and dark values where there is low or no coherence in the backscattered wavefronts (or vice versa). The coherence may be affected by the properties of the tissues on which the waveforms reflect or scatter and thus a coherence map may be used to image the underlying tissues. In more detail, the spatial coherence function is a measure of the correlation function between signals with a given spacing, or lag, of m elements. This function is defined at every field point x in the ultrasound image. Thus $R_m(x)$ is the measured correlation coefficient of transducer element signals from field point x for transducer elements having a relative lag of m. For two-dimensional transducer arrays, m refers to a two-dimensional lag, with components in the two dimensions of the array. In some cases, these measured correlation coefficients are computed by averaging over a correlation window (e.g., a one wavelength axial signal window centered at x). In other cases no averaging is performed to provide these correlation coefficients, leading to so-called 'single-pixel' computations. Here field point x can be a pair of two coordinates (x=(x1, x2)) or a triplet of three coordinates (x=x1, x2, x3) for 2D and 3D cases, respectively.

Integration of a spatial coherence function can be performed by analog integration over the appropriate range, but in practice this integration is typically performed by a discrete summation over an appropriate range of indices.

For 1-D transducer arrays, the ultrasound transducer array can have N elements and the predetermined integration window is preferably a lag range from 1 to N/2 and is more preferably a lag range from 1 to N/4. For 2-D transducer arrays, the ultrasound transducer array can have Nx×Ny elements and the predetermined integration window is preferably a lag range from 1 to Nx/2 and from 1 to Ny/2 and is more preferably a lag range from 1 to Nx/4 and from 1 to Ny/4 and is still more preferably the set of all 2-D lags (mx, my) such that (1−mx/Nx) (1−my/Ny)>0.75. Further details on suitable beamforming methods for spatial coherence imaging are given in an article by Hyun et al. (IEEE Transactions on Ultrasonics, Ferroelectrics and Frequency Control, v61n7, pp. 1101-1112, 2014).

Figure 3:
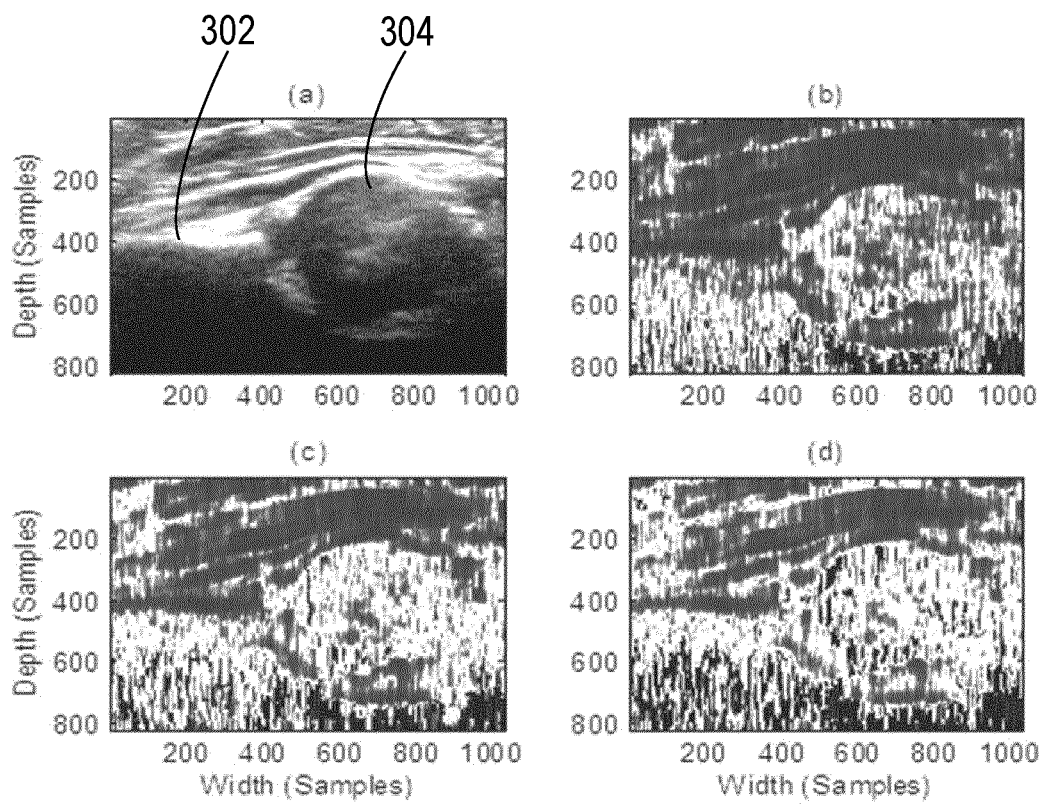

An example ultrasound image of an infant hip is provided in FIG. 3a, which shows a B-mode image of the ilium (the linear structure 302) and the near-spherical femur head 304. FIGS. 3b, 3c and 3d show coherence maps corresponding to the image in FIG. 3a for lags of 2, 3 and 4 respectively. FIGS. 4e, 4f, 4g and 4h illustrate the coherence maps for lags of 5, 6, 7 and 8 respectively. In this example, the ilium is located at depth range of [360 410] pixels and width range of [1 400] pixels, and the femur head looks reasonably spherical, but lacks clarity. However, there is clear appearance of a circle corresponding to the femur head in the spatial coherence maps of FIGS. 3b to 4h. This is because the ultrasound signal from the boundary of the femur head is highly coherent while noise or other artifacts are less coherent.

Figure 4:
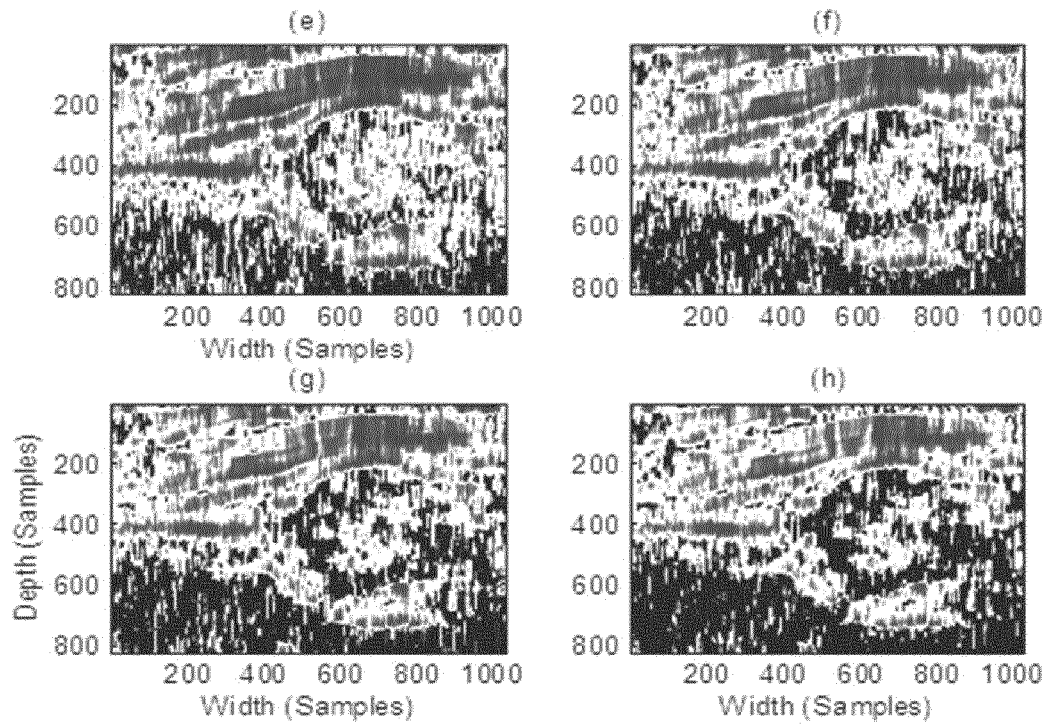

In the example shown in FIGS. 3 and 4, the optimal sliding window length is determined by changing the length from 10 to 80 pixels, and the range is between 30 to 50 pixels; so a length of 41 pixels was used when computing these spatial coherence maps. It will be appreciated that this is merely an example however and that different sliding window lengths may be appropriate for different embodiments herein.

Generally, the spatial coherence map may be obtained using the coherence function R(m) which is computed using cross-correlations performed between pairs of transducer elements separated by a distance m(c). The coherence function R is assessed as a function of distance in number of elements m (or lag) by making auto-correlations between all pairs of receiver elements. For example, coherence may be calculated for lag m according to the following equation:

$$R(m) = \frac{N}{N-m} \frac{\sum_{i=1}^{N-m} c(i, i+m)}{\sum_{i=1}^{N} c(i, i)}.$$

The processor is then caused to determine a quality metric based on the ultrasound image of the hip and the spatial coherence map. In this sense, the quality metric indicates the suitability of the ultrasound image for making the measurement of the hip. For example, the quality metric may generally represent an estimation of the suitability of the ultrasound image for making measurements of the hip of an infant. In some embodiments, the quality metric may represent the clarity or image quality of the ultrasound image. In other embodiments the quality metric may represent the suitability of the angle, or two-dimensional slice through the hip represented by the ultrasound image. In some embodiments the quality metric may combine these aspects.

Figure 5:
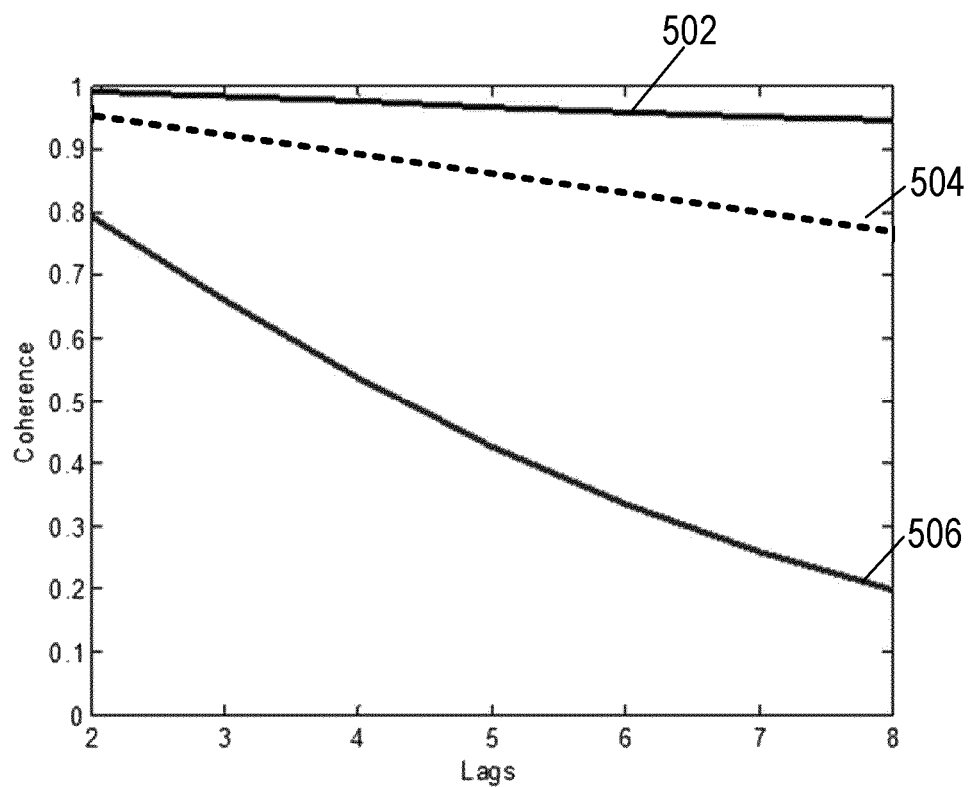
FIG. 5 is a graph showing different averaged spatial coherence values for different lags and positions within the anatomy.

From the spatial coherence maps of FIG. 3 b-d and FIG. 3 e-h, the inventors herein have noted there is a drop off in coherence (e.g. a relatively high gradient in the coherence map) for the region below the ilium where there may be noise due to the fact that the ultrasound waves are unable to penetrate the bone type tissue like the ilium, however, there is less reduction in coherence for the soft tissue above the ilium. The averaged spatial coherence values for the ilium, noise region below the ilium, and soft tissue above the ilium were thus computed for lags ranging from 2 to 8, and these curves are shown in FIG. 5 which shows averaged spatial coherence values for lag of 2 to 8 for the ilium region (curve 502), noise region below the ilium (curve 504), and soft tissue above the ilium (curve 506).

From the study above, the inventors herein have drawn the following conclusions:
(1) There is (high or relatively high, e.g. above a threshold) spatial coherence on the US image for the ilium;
(2) Acoustic shadow due to the ilium is highly de-coherent on the US image;
(3) Human soft tissue is partially spatially coherent, but the boundary between different soft tissues shows relatively high coherence on the US image.

The spatial coherence map could be also used to estimate the dimensions or other properties of the circle/ring of the femur head due to the strong enhanced appearance of the femur head in the spatial coherence maps. The contrast ratio between the ilium (or soft tissue above the ilium) and/or the noise region between the ilium from a B-mode US image with spatial coherence maps, may thus be used as indicators to determine whether the B-mode image is of sufficient quality for later dysplastic metrics measurement.

For example, if both the contrast ratio and coherence value for the ilium and soft tissue are high, then the US image may be of sufficient quality for correct measurement of dysplastic metrics, otherwise, the US image may be not good enough to make such measurements.

Generally, therefore, an ultrasound image may be of sufficient quality if some or all of the following criteria are satisfied:
there is high contrast resolution between the key structures (the ilium and soft tissue above the ilium) and a noise region (acoustic shadow) below the ilium
the ilium comprises a horizontal line (or near horizontal line) in the middle of 2D ultrasound image
the femur head comprises a circle/ring close to the center of the 2D ultrasound image
the US image shows a plane through the femur head that bisects the femur head at its widest point.

Therefore, in some embodiments, the quality metric may be based on a measure of spatial coherence at an ilium or femur head; a measure of a contrast between the ilium and noise in a region neighboring the ilium; and/or a measure of the diameter of the femur head.

In more detail, in some embodiments, the quality metric may indicate that the ultrasound image is above a threshold quality if a coherence value associated with the ilium is above a first threshold. For example, the ultrasound image may be of sufficient quality if the averaged coherence value for the ilium is closer to a (normalized) value of 1.0. the first threshold may therefore be set, for example at a value of 0.8, or a value of 0.9 or a value of 0.95.

In some embodiments, the quality metric may indicate that the ultrasound image is above a threshold quality if a measure of a contrast between the ilium and the noise in a region neighbouring the ilium is above a second threshold. For example, the second threshold may be set such that the ultrasound image is deemed sufficient quality if a contrast ratio between the ilium (or its nearby soft tissue) and a noise region below the ilium is relatively high. For example, if the contrast is above a value of about for example: 3 dB. The ratio is the parameter after the calibration while the absolute parameter may be calibrated.

In some embodiments, the quality metric may indicate that the ultrasound image is above a threshold quality if the ultrasound image comprises a plane through a femur head wherein the diameter of the femur head is at (or approximately at, e.g. within a threshold tolerance of) its maximum value.

Generally, the femur head is not a precise sphere and in embodiments, for example, where the measurement comprises a Graf measurement, the measurement should be made in an ultrasound image comprising a plane (e.g. cross-section) through the hip joint that bisects the femur head at its widest point. Put another way, the measurement should be made in a plane that cuts through the femur head at its maximum diameter and/or maximum cross-sectional area. This ensures a consistent reference plane is used for all operators/sonographers.

Imagining the femur head like a spheroidal, there is one plane that bisects the femur head at the maximum diameter, and a task of the operator may be to determine this plane. In some embodiments, therefore, the processor 202 may be configured to determine the diameter of the femur head in real-time, during an ultrasound examination, and send an instruction to the display 206 to instruct the display to display the determined diameter to the user (e.g. operator or sonographer) performing the ultrasound examination. In this way, the user may be aided to obtain an image comprising a plane near to, or through the maximum diameter of the femur head.

The diameter of the femur head may be determined from an ultrasound image by . . . .

In some embodiments, the quality metric may indicate that the ultrasound image is above a threshold quality if a coherence value associated with the femur head is above a third threshold. The coherence value may comprise an averaged coherence value.

In some embodiments, the measures described above may be combined into a single number or score. For example, the ultrasound image quality may be classified as good enough for later measurement if the US image score is above a fourth threshold (for example: if the US score is calibrated such that the maximum score is 100, in one example, the threshold may be 90).

An appropriate value for the fourth threshold may be determined based on the properties of the ultrasound scanner (e.g. how it is calibrated), and/or the properties of the patient population. A combined score (for example, combining the averaged coherence for the ilium, the contrast ratio between the ilium and nearby soft tissue at similar imaging depth and/or the noise level from the 2D ultrasound image; and/or a measure of whether a plane comprising the maximum diameter through the femur head has been achieved) may be determined from collected datasets including normal subjects and patients with DDH, and ground truths for the datasets as determined by clinical diagnosis. Experienced ultrasound doctors or sonographers usually have a strong 'feeling patterns' (objective) for high quality ultrasound images where all properties are within the image. So formulas or patterns may be discerned based on these annotations.

Generally, as described above, the quality metric may be used to determine whether the US image is good enough for the measurement to be made. If the US image is not of sufficient quality, then the processor may be caused to indicate to the user (e.g. by sending an instruction to the display) that the obtained image is not suitable for making the measurement. The processor may be caused to instruct the user to move the probe and/or change the probe angle until a suitably high quality ultrasound image is acquired for which the quality metric indicates that the ultrasound image is above a threshold quality.

Once an image is obtained whereby the quality metric indicates that the ultrasound image is above the threshold quality, the processor may be configured to provide an indication to the user (e.g. by sending an instruction to a display 208) that the ultrasound image is suitable for making the measurement of the hip. The indication may comprise an audio or visual prompt, for example.

In some embodiments, the processor may be further caused to use the ultrasound image and/or the coherence map to determine the measurement of the hip. To this end, in some examples, the processor may be caused to segment the ultrasound image and/or one or more coherence maps associated with the ultrasound image. Referring back to FIGS. 3*a*-4*h*, the strong appearance of the femur head and ilium in the coherence maps, makes it likely that an improved segmentation of the ilium and/or femur head may be produced by combining one or more of the spatial coherence maps with the 2D B-mode US image. Therefore, in some embodiments, one or more spatial coherence maps and/or the ultrasound image may be combined before a segmentation is performed.

In some embodiments, spatial coherence maps with different lags may be combined into a "combined spatial coherence map" and the processor may be caused to use the combined spatial coherence map to determine the measurement of the hip. In other words, a combination of spatial coherence maps (e.g. normalized and averaged, or combined in some other way) may be segmented.

In some embodiments, the ultrasound image and the spatial coherence map may be combined into a single image, which will be referred to herein as the "combined image". The processor may then be caused to segment the ilium and femur head in the combined image, and use the segmentation of the ilium and femur head to make the measurement of the hip. For example, the coherence map may be used as a mask. The combined image may be determined according to: mask×original US image. In another example, a threshold may be applied to the coherence map to convert the coherence map into a binary image. The threshold may be, for example, 0.6. In such an example, the combined image may then be determined as binary image×original US image. In another example, a linear combination of both approaches above may be taken.

The skilled person will be familiar with image segmentation, but in brief, image segmentation involves extracting shape/form information about the objects or shapes captured in an image. This may be achieved by converting the image into constituent blocks or "segments", the pixels or voxels in each segment having a common attribute. In some methods, image segmentation may comprise fitting a model to one or more features in an image.

Examples of image segmentation that may be performed by the processor 202 on the combined image include, but are not limited to: Model-Based Segmentation (MBS), whereby a triangulated mesh of a target structure (such as, for example, a heart, brain, lung etc.) is adapted in an iterative fashion to features in an image, and Machine Learning (ML) segmentation whereby a ML model is used to convert an image into a plurality of constituent shapes (e.g. block shapes or block volumes), based on similar pixel/voxel values and image gradients. Further information about MBS as applied to medical images may be found, for example, in the paper by Ecabert, O., et al. 2008 entitled "*Automatic Model-Based Segmentation of the Heart in CT Images*"; IEEE Trans. Med. Imaging 27 (9), 1189-1201.

A spheroid may be fit to the femur head in order to determine, for example its position and diameter. Thus in some embodiments, the processor being caused to use the segmentation of the ilium and femur head to make the measurement of the hip may comprise the processor being caused to fit an ellipse to a segment of the segmentation corresponding to the femur head, for example, using a Hough transform.

In embodiments where the segmentation is performed on a coherence map, combined coherence map, or combined image, the use of the coherence may provide an improved fitting Hough transform, since the femur head is brighter in the spatial coherence map compared to the ultrasound image (see FIGS. 3 *b-d* and 4*e-h* compared to the US B-mode image in FIG. 3*a*).

The processor may then be caused to send an instruction to a display to cause the display to mark the fitted ellipse and/or the segments of the segmentation corresponding to the ilium and the femur head onto the ultrasound image, and/or make the measurement of the hip relative to the marked fitted ellipse and/or the segmentation corresponding to the ilium and the femur head.

The processor may further be caused to use the measurement of the hip to diagnose developmental dysplasia of the hip, DDH. This may be performed, for example, by comparing the measurements to well-known scales associated with the particular type of measurement performed. For example, there are thresholds associated with the Graf values of angles α and β illustrated in FIG. 1, that can be used to diagnose DDH.

The determined measurements (e.g. dysplasia metrics) may be displayed on the screen, in addition or alternatively to the segmented ilium and femur head. The processes performed by the processor 202 above may be split into modules. For example, some embodiments may comprise one or more of the following modules: i) a module to perform freehand sweeping/scanning of the surface of the infant's hip to obtain a serial 2D ultrasound image sequence using a 1D high-frequency linear ultrasound probe ii) A module to reconstruct a 3D ultrasound volume image from the 2D ultrasound image sequence using a deep-learning algorithm (as described above) iii) A module to perform automated key structures (for example: ilium and femur head (circle)) detection and measure dysplastic metrics. The module may employ spatial coherence properties of US images as described above iv) a module to determine the quality metric described above which, for a given transducer position, may determine whether the acquired 2D ultrasound image is suitable for later metrics measurement, for example: to check if key structures (the ilium and femur head) are shown sufficiently well in a 2D ultrasound image or 3D ultrasound volume v) A reporting module that, for a given position of the transducer, may provide information on the representative frame with useful information such as: (a) the detected ilium (b) the detected femur head or circle; (c) indication if the infant is normal (metrics are above a threshold) or (d) indication if the infant is DDH (metrics are small) and vi) A module that may provide a pictorial representation of the 2D US image or 3D US volume (or a slice 2D image) with detected typical landmarks of the hip.

The embodiments of the system 200 may be used in ultrasound imaging for infant DDH diagnosis and screening. The system can be used in (a) pre-hospital settings (small clinics or family), (b) initial evaluation in the hospital, and (c) follow-up after proper DDH treatments. The teachings herein are applicable to many ultrasound imaging systems and are thus not restricted to any particular ultrasound imaging devices. The teachings are further not restricted to any particular DDH study (diagnosis and screening).

The system 200 may thus provide increased confidence for inexperienced users for ultrasound-based DDH diagnosis and screening; improved workflows by reducing examination and interpretation time; reduced user dependence and standardized reporting schemes; and facilitate easier archiving and documentation for subsequent usage such as billing or teaching purposes.

Figure 6:
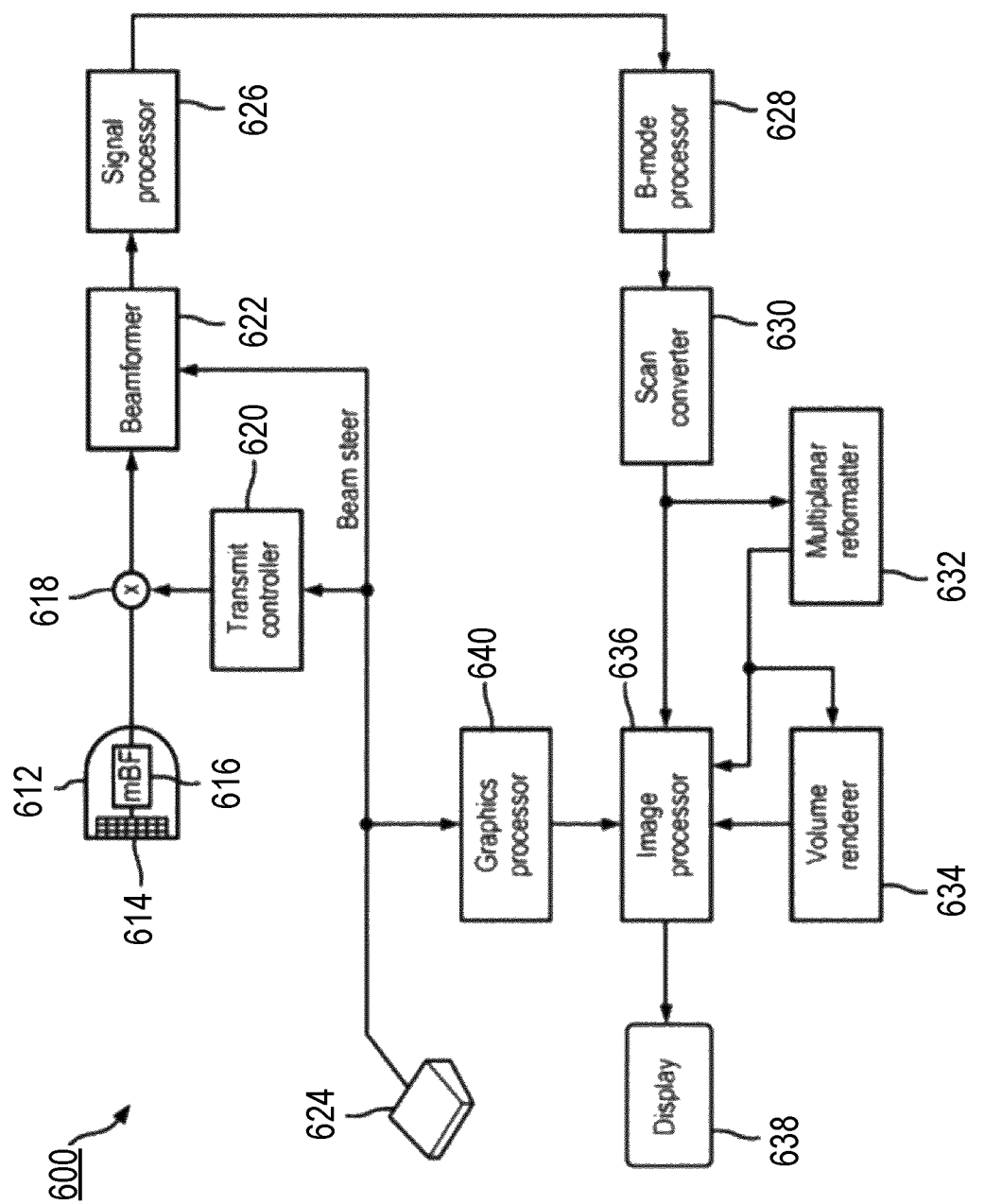
FIG. 6 illustrates an example ultrasound system according to some embodiments herein.

Turning now to FIG. 6, FIG. 6 shows an example embodiment of an ultrasound system 600, constructed according to the principles described herein. One or more components shown in FIG. 6 may be included within a system configured to perform any of the methods described herein. For example, one or more processing components may be configured to obtain an ultrasound image of the hip, obtain a spatial coherence map associated with one or more lags of the ultrasound waves associated with the ultrasound image, determine a quality metric based on the ultrasound image of the hip and the spatial coherence map, wherein the quality metric indicates the suitability of the ultrasound image for making the measurement of the hip, and if the quality metric indicates that the ultrasound image is above a threshold quality, indicate that the ultrasound image is suitable for making the measurement of the hip.

For example, any of the above described functions of the processor 202 may be programmed, e.g., via computer executable instructions, into a processor of the system 600. In some examples, the functions of the processor 202 may be implemented and/or controlled by one or more of the processing components shown in FIG. 6, including for example, the image processor 636.

In the ultrasound imaging system of FIG. 6, ultrasound probe 612 includes a transducer array 614 for transmitting ultrasonic waves into a region of the body and receiving echo information responsive to the transmitted waves. The transducer array 614 may be a matrix array that includes a plurality of transducer elements configured to be individually activated. In other embodiments, the transducer array 614 may comprise a one-dimensional linear array. The transducer array 614 is coupled to a micro-beamformer 616 in the probe 612 which may control the transmission and reception of signals by the transducer elements in the array. In the example shown, the micro-beamformer 616 is coupled by the probe cable to a transmit/receive (T/R) switch 618, which switches between transmission and reception and protects the main beamformer 622 from high energy transmit signals. In some embodiments, the T/R switch 618 and other elements in the system can be included in the transducer probe rather than in a separate ultrasound system base.

The transmission of ultrasonic beams from the transducer array 614 under control of the microbeamformer 616 may be directed by the transmit controller 620 coupled to the T/R switch 618 and the beamformer 622, which receives input, e.g., from the user's operation of the user interface or control panel 624. One of the functions controlled by the transmit controller 620 is the direction in which beams are steered. Beams may be steered straight ahead from (orthogonal to) the transducer array, or at different angles for a wider field of view. The partially beamformed signals produced by the microbeamformer 616 are coupled to a main beamformer 622 where partially beamformed signals from individual patches of transducer elements are combined into a fully beamformed signal.

The beamformed signals are coupled to a signal processor 626. Signal processor 626 may process the received echo signals in various ways, such as bandpass filtering, decimation, I and Q component separation, and harmonic signal separation. Data generated by the different processing techniques employed by the signal processor 626 may be used by a data processor to identify internal structures, e.g., ribs, or anatomical features of a neonate, and parameters thereof.

The signal processor 626 may also perform additional signal enhancement such as speckle reduction, signal compounding, and noise elimination. The processed signals may be coupled to a B-mode processor 628, which can employ amplitude detection for the imaging of structures in the body, including the ribs, the heart, and/or the pleural interface, for example. The signals produced by the B-mode processor are coupled to a scan converter 630 and a multiplanar reformatter 632. The scan converter 630 arranges the echo signals in the spatial relationship from which they were received in a desired image format. For instance, the scan converter 630 may arrange the echo signals into a two dimensional (2D) sector-shaped format. The multiplanar reformatter 632 can convert echoes which are received from points in a common plane in a volumetric region of the body into an ultrasonic image of that plane, as described in U.S. Pat. No. 6,663,896 (Detmer). A volume renderer 634 converts the echo signals of a 3D data set into a projected 3D image as viewed from a given reference point, e.g., as described in U.S. Pat. No. 6,530,885 (Entrekin et al).

The 2D or 3D images are coupled from the scan converter 630, multiplanar reformatter 632, and volume renderer 634 to an image processor 636 for further enhancement, buffering and temporary storage for display on an image display 638.

The graphics processor 640 can generate graphic overlays for display with the ultrasound images. These graphic overlays can contain, for example, segments produced as a result of a segmentation performed on the ultrasound image or a spatial coherence map of the ultrasound image and/or the location of the ilium or femur head as determined by according to the method herein.

Graphic overlays may further contain other information, for example, standard identifying information such as patient name, date and time of the image, imaging parameters, and the like. Graphic overlays may also include one or more signals indicating the target image frame has been obtained and/or the system 600 is in the process of identifying the target image frame. The graphics processor 640 may receive input from the user interface 624, such as a typed patient name. The user interface 624 may also receive input prompting adjustments in the settings and/or parameters used by the system 600. The user interface can also be coupled to the multiplanar reformatter 632 for selection and control of a display of multiple multiplanar reformatted (MPR) images.

The skilled person will appreciate that the embodiment shown in FIG. 6 is an example only and that the ultrasound system 600 may also comprise additional components to those shown in FIG. 6, for example, such as a power supply or battery.

Figure 7:
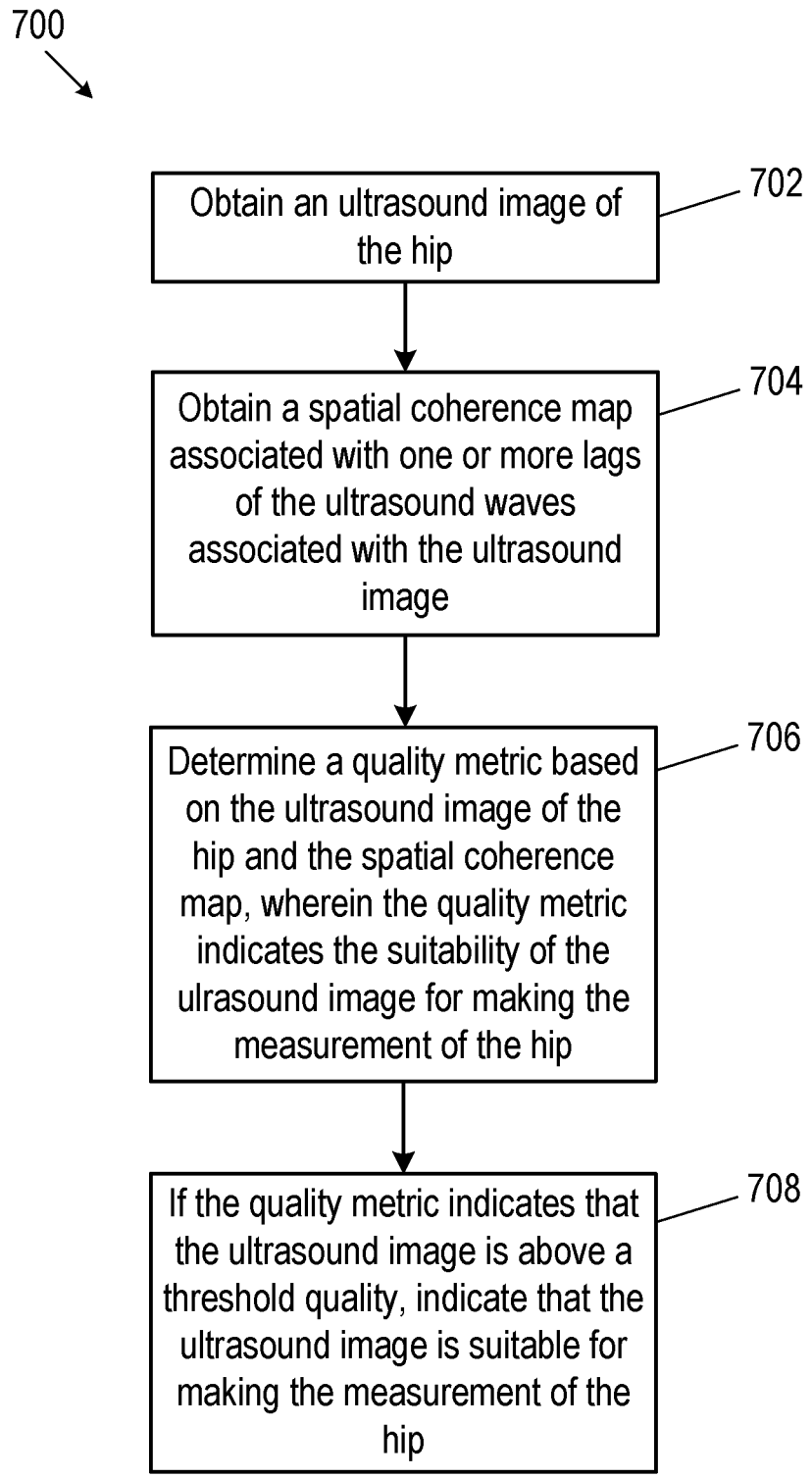
FIG. 7 illustrates a method according to some embodiments herein.

FIG. 7 illustrates a method 700 for making a measurement of the hip in an ultrasound image. The method 700 may be performed, for example, by either of the systems 200 or 600 as described above. Briefly, in a first block 702, the method 700 comprises obtaining an ultrasound image of the hip. In a second block 704 the method comprises obtaining a spatial coherence map associated with one or more lags of the ultrasound waves associated with the ultrasound image. In a third block 706 the method comprises determining a quality metric based on the ultrasound image of the hip and the spatial coherence map, wherein the quality metric indicates the suitability of the ultrasound image for making the measurement of the hip. In a fourth block 708, if the quality metric indicates that the ultrasound image is above a threshold quality, indicating that the ultrasound image is suitable for making the measurement of the hip.

The functionality of blocks 702, 704, 606 and 708 was described in detail above with respect to the functionality of the processor 202 and the detail therein will be understood to apply equally to embodiments of the method 700.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for making a measurement of a hip in an ultrasound image, the system comprising:
   a memory comprising instruction data representing a set of instructions; and
   a processor configured to communicate with the memory and to execute the set of instructions, wherein the set of instructions, when executed by the processor, cause the processor to:
   obtain an ultrasound image of a hip including an ilium and a femur head;
   obtain a spatial coherence map associated with one or more lags of ultrasound waves associated with the ultrasound image;

determine a quality metric based on the ultrasound image of the hip and the spatial coherence map, wherein the quality metric indicates a suitability of the ultrasound image for making the measurement of the hip; and if the quality metric indicates that the ultrasound image is above a threshold quality, indicate that the ultrasound image is suitable for making the measurement of the hip.

2. A system as in claim 1 wherein the quality metric is based on:
a measure of spatial coherence at the ilium or femur head;
a measure of a contrast between the ilium and noise in a region neighboring the ilium; and/or
a measure of a diameter of the femur head.

3. A system as in claim 1 wherein the quality metric indicates that the ultrasound image is above the threshold quality if:
a coherence value associated with the ilium is above a first threshold.

4. A system as in claim 1 wherein the quality metric indicates that the ultrasound image is above the threshold quality if:
a measure of a contrast between the ilium and noise in a region neighbouring the ilium is above a second threshold.

5. A system as in claim 1 wherein the quality metric indicates that the ultrasound image is above the threshold quality if:
the ultrasound image comprises a plane through the femur head wherein a diameter of the femur head is at its maximum value.

6. A system as in claim 2 wherein the quality metric indicates that the ultrasound image is above the threshold quality if:
a coherence value associated with the femur head is above a third threshold.

7. A system as in claim 1 wherein the processor is further caused to use the ultrasound image to determine the measurement of the hip.

8. A system as in claim 7 wherein the processor being caused to use the ultrasound image to determine the measurement of the hip comprises the processor being caused to:
combine the ultrasound image and the spatial coherence map into a combined image;
segment the ilium and femur head in the combined image into a segmentation of the ilium and femur head; and
use the segmentation of the ilium and femur head to make the measurement of the hip.

9. A system as in claim 8 wherein the processor being caused to use the segmentation of the ilium and femur head to make the measurement of the hip comprises the processor being caused to:
fit an ellipse to a segment of the segmentation corresponding to the femur head, using a Hough transform.

10. A system as in claim 9 wherein the processor is further caused to:
send an instruction to a display to cause the display to mark the fitted ellipse and/or the segments of the segmentation corresponding to the ilium and the femur head onto the ultrasound image; and
make the measurement of the hip relative to the marked fitted ellipse and/or the segmentation corresponding to the ilium and the femur head.

11. A system as in claim 1 wherein the processor being caused to obtain the ultrasound image of the hip comprises the processor being caused to:
receive a plurality of two dimensional ultrasound images;
use a model trained using a machine learning process to determine a best image for later measurement from the plurality of two dimensional ultrasound images; and
select the best image for later measurement as the obtained ultrasound image.

12. A system as in claim 1 wherein the processor being caused to obtain the ultrasound image comprises the processor being caused to:
receive a plurality of two dimensional ultrasound images;
use a model trained using a machine learning process to reconstruct a three-dimensional volume from the plurality of two dimensional ultrasound images; and
select a slice through the three dimensional volume as the obtained ultrasound image.

13. A system as in claim 1 wherein the processor is further caused to use the measurement of the hip to diagnose developmental dysplasia of the hip, DDH.

14. A method for making a measurement of a hip in an ultrasound image, the method comprising:
obtaining an ultrasound image of a hip including an ilium and a femur head;
obtaining a spatial coherence map associated with one or more lags of the ultrasound waves associated with the ultrasound image;
determining a quality metric based on the ultrasound image of the hip and the spatial coherence map, wherein the quality metric indicates the suitability of the ultrasound image for making the measurement of the hip; and
if the quality metric indicates that the ultrasound image is above a threshold quality, indicating that the ultrasound image is suitable for making the measurement of the hip.

15. A computer program product comprising a non-transitory computer readable medium, the non-transitory computer readable medium having computer readable code embodied therein, the computer readable code being configured such that, on execution by a suitable computer or processor, the computer or processor is caused to perform the method as claimed in claim 14.

* * * * *